United States Patent
Xu

(10) Patent No.: US 10,803,304 B2
(45) Date of Patent: Oct. 13, 2020

(54) GESTURE RECOGNITION METHOD, DEVICE, APPARATUS, AND STORAGE MEDIUM

(71) Applicant: BOE TECHNOLOGY GROUP CO., LTD., Beijing (CN)

(72) Inventor: Chu Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 16/232,536

(22) Filed: Dec. 26, 2018

(65) Prior Publication Data

US 2019/0228214 A1 Jul. 25, 2019

(30) Foreign Application Priority Data

Jan. 24, 2018 (CN) .......................... 2018 1 0069799

(51) Int. Cl.
G06K 9/00 (2006.01)

(52) U.S. Cl.
CPC ................ G06K 9/00335 (2013.01)

(58) Field of Classification Search
CPC ........... G06K 9/00335; G06K 9/00355; G06K 9/00342; G06K 9/4671; G06K 9/6269;
(Continued)

(56) References Cited

U.S. PATENT DOCUMENTS

| 8,774,464 B2 * | 7/2014 | Adhikari ................ G06F 3/017 382/103 |
| 9,141,148 B2 * | 9/2015 | Richter ................ G06F 1/1626 |

(Continued)

FOREIGN PATENT DOCUMENTS

| CN | 103455794 A | 12/2013 |
| CN | 105912974 A | 8/2016 |

(Continued)

OTHER PUBLICATIONS

First Office Action dated Apr. 15, 2020 corresponding to Chinese application No. 201810069799.8.
(Continued)

*Primary Examiner* — Michael S Osinski
(74) *Attorney, Agent, or Firm* — Nath, Goldberg & Meyer; Joshua B. Goldberg

(57) ABSTRACT

The present application provides a gesture recognition method, a device, an apparatus and a storage medium. The gesture recognition method includes: acquiring coordinates of a center point of a gesture in an $i^{th}$ frame of image; determining whether the center point of the gesture in the $i^{th}$ frame of image is within a preset region; if yes, determining that coordinates of an actual center point of the gesture in the $i^{th}$ frame of image are coordinates of an actual center point of the gesture in the $(i-1)^{th}$ frame of image; wherein i is an integer greater than or equal to 2, and the preset region is a region taking the actual center point of the gesture in the $(i-1)^{th}$ frame of image as a center; and performing a dynamic-gesture recognition according to coordinates of an actual center point of the gesture in each frame of image.

20 Claims, 3 Drawing Sheets

(58) Field of Classification Search
CPC ............ G06K 9/00006; G06K 9/0013; G06K
9/0008; G06K 9/00375; G06K 9/40;
G06K 9/60; G06K 9/6202; G06F 3/017;
G06F 3/0304; G06F 3/0416; G06F
3/0418; G06F 3/0425; G06F 3/0428;
G06F 3/04842; G06F 3/04847; G06F
3/0485; G06F 3/0486; G06F 3/0488;
G06F 3/04883; G06F 2203/04806; G06F
2203/0381; H04N 5/2258; H04N 13/218;
H04N 13/229; H04N 13/232; H04N
13/25; G06T 2207/10016; G06T
2207/10024; G06T 2207/20081; G06T
2207/30196; G06T 2207/30241
See application file for complete search history.

(56) References Cited

U.S. PATENT DOCUMENTS

| | | | | |
|---|---|---|---|---|
| 9,154,671 | B2* | 10/2015 | Nagano | H04N 5/222 |
| 9,288,373 | B2* | 3/2016 | Xie | H04N 5/2258 |
| 9,710,693 | B2* | 7/2017 | Gatge | G06K 9/00073 |
| 9,769,458 | B2* | 9/2017 | Wippermann | H04N 13/218 |
| 9,990,117 | B2* | 6/2018 | Cook | G06F 3/04842 |
| 10,217,264 | B2* | 2/2019 | Vaganov | G06T 15/02 |
| 2011/0110560 | A1* | 5/2011 | Adhikari | G06T 7/246 |
| | | | | 382/103 |
| 2013/0300890 | A1* | 11/2013 | Nagano | H04N 5/222 |
| | | | | 348/222.1 |
| 2013/0342671 | A1* | 12/2013 | Hummel | G06F 3/011 |
| | | | | 348/77 |
| 2014/0286546 | A1* | 9/2014 | Shin | G06K 9/00067 |
| | | | | 382/124 |
| 2015/0244911 | A1* | 8/2015 | Xie | G06F 3/017 |
| | | | | 348/207.11 |
| 2016/0048726 | A1* | 2/2016 | Tang | G06K 9/00355 |
| | | | | 382/103 |
| 2016/0180141 | A1* | 6/2016 | Sarve | G06K 9/0008 |
| | | | | 382/124 |
| 2016/0209927 | A1* | 7/2016 | Yamagishi | G06F 3/0304 |
| 2016/0255330 | A1* | 9/2016 | Wippermann | H04N 13/218 |
| | | | | 348/49 |
| 2016/0283768 | A1* | 9/2016 | Kounavis | G06K 9/00389 |
| 2016/0306449 | A1* | 10/2016 | de los Reyes | G06F 3/03547 |
| 2017/0003805 | A1* | 1/2017 | Chen | G06F 3/044 |
| 2017/0038947 | A1* | 2/2017 | Cook | G06F 3/0486 |
| 2017/0083741 | A1* | 3/2017 | Gao | G06K 9/00912 |
| 2017/0336891 | A1* | 11/2017 | Rosenberg | G06F 3/0412 |
| 2018/0082049 | A1* | 3/2018 | Olofsson | G06K 9/00912 |
| 2018/0088671 | A1* | 3/2018 | Wang | G06K 9/00375 |
| 2018/0189468 | A1* | 7/2018 | Shim | H04W 12/06 |
| 2019/0146578 | A1* | 5/2019 | Ikuta | G06F 3/04815 |
| | | | | 345/8 |
| 2019/0188460 | A1* | 6/2019 | Zhang | G06K 9/00355 |
| 2019/0311190 | A1* | 10/2019 | Wang | G06T 7/11 |
| 2020/0026910 | A1* | 1/2020 | Wang | G06N 3/0454 |
| 2020/0126249 | A1* | 4/2020 | Tang | G06T 7/579 |

FOREIGN PATENT DOCUMENTS

| | | |
|---|---|---|
| CN | 106371614 A | 2/2017 |
| CN | 107589850 A | 1/2018 |

OTHER PUBLICATIONS

Second Office Action dated Jul. 30, 2020 corresponding to Chinese application No. 201810069799.8.

* cited by examiner

GESTURE RECOGNITION METHOD, DEVICE, APPARATUS, AND STORAGE MEDIUM

CROSS-REFERENCE TO RELATED APPLICATION

The present application claims priority to Chinese Patent Application No. 201810069799.8, filed on Jan. 24, 2018, the disclosure of which is hereby incorporated by reference in its entirety.

TECHNICAL FIELD

The present disclosure relates to the field of artificial intelligence technology, in particular, to a gesture recognition method, a device, an apparatus, and a storage medium.

BACKGROUND

Gesture recognition function has gradually become a new function of a terminal device such as a digital frame, a household appliance, and the like. During recognizing a dynamic gesture, the gesture detection should be performed on consecutive image frames. In this case, if the hand of an operator shakes slightly and unintentionally, its mapping in the image frames may jitter accordingly, which causes a slight jitter in the recognized dynamic gesture, and thus affects the operation experience of the operator and the accuracy of the recognition.

SUMMARY

According to an embodiment of the present disclosure, there is provided a gesture recognition method which includes: acquiring coordinates of a center point of a gesture in an $i^{th}$ frame of image; determining whether the center point of the gesture in the $i^{th}$ frame of image is within a preset region; determining, if the center point of the gesture in the $i^{th}$ frame of image is within the preset region, that coordinates of an actual center point of the gesture in the $i^{th}$ frame of image are coordinates of an actual center point of the gesture in the $(i-1)^{th}$ frame of image; where i is an integer greater than or equal to 2, and the preset region is a region taking the actual center point of the gesture in the $(i-1)^{th}$ frame of image as a center; and performing a dynamic-gesture recognition according to coordinates of an actual center point of the gesture in each frame of image.

In an embodiment, the method further includes: calculating, if the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

In an embodiment, the method further includes: dividing the image into a mesh including a plurality of grids, wherein the preset region is a region taking a grid, in which the actual center point of the gesture in the $(i-1)^{th}$ frame of image is located, as a center.

In an embodiment, calculating the coordinates of the actual center point of the gesture in the $i^{th}$ frame of image includes:

calculating a horizontal coordinate of the actual center point of the gesture in the $i^{th}$ frame of image according to a formula $$X_{Bi} = X_{B1} + P_1 \frac{(C+1)D}{2},$$

when an absolute value of a remainder of $$\frac{X_{Ai} - X_{B1}}{(C+1)D/2}$$

is less than $$\frac{CD}{2};$$

calculating a vertical coordinate of the actual center point of the gesture in the $i^{th}$ frame of image according to a formula $$Y_{Bi} = Y_{B1} + P_2 \frac{(C+1)D}{2},$$

when an absolute value of a remainder of $$\frac{Y_{Ai} - Y_{B1}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of a actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

In an embodiment, calculating the coordinates of the actual center point of the gesture in the $i^{th}$ frame of image includes:

calculating a horizontal coordinate of the actual center point of the gesture in the $i^{th}$ frame of image according to a formula $$X_{Bi} = X_{B(i-1)} + Q_1 \frac{(C+1)D}{2},$$

when an absolute value of a remainder of $$\frac{X_{Ai} - X_{B(i-1)}}{(C+1)D/2}$$

is less than $$\frac{CD}{2};$$

calculating a vertical coordinate of the actual center point of the gesture in the $i^{th}$ frame of image according to a formula $$Y_{Bi} = Y_{B(i-1)} + Q_2 \frac{(C+1)D}{2},$$

when an absolute value of a remainder of $$\frac{Y_{Ai} - Y_{B(i-1)}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $X_{B(i-1)}$ is a horizontal coordinate of the actual center point of the gesture in the $(i-1)^{th}$ frame of image, and $Y_{B(i-1)}$ is a vertical coordinate of the actual center point of the gesture in the $(i-1)^{th}$ frame of image.

In an embodiment, calculating the coordinates of the actual center point of the gesture in the $i^{th}$ frame of image includes:

calculating a horizontal coordinate of the actual center point of the gesture in the $i^{th}$ frame of image according to a formula $$X_{Bi} = X_{B1} + (P_1 + 1)\frac{(C+1)D}{2},$$

when an absolute value of a remainder of $$\frac{X_{Ai} - X_{B1}}{(C+1)D/2}$$

is greater than or equal to $$\frac{CD}{2};$$

calculating a vertical coordinate of the actual center point of the gesture in the $i^{th}$ frame of image according to a formula $$Y_{Bi} = Y_{B1} + (P_2 + 1)\frac{(C+1)D}{2},$$

when an absolute value of a remainder of $$\frac{Y_{Ai} - Y_{B1}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of an actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

In an embodiment, calculating the coordinates of the actual center point of the gesture in the $i^{th}$ frame of image includes:

calculating a horizontal coordinate of the actual center point of the gesture in the $i^{th}$ frame of image according to a formula $$X_{Bi} = X_{B(i-1)} + (Q_1 + 1)\frac{(C+1)D}{2},$$

when an absolute value of a remainder of $$\frac{CD}{2};$$

is greater than or equal to $$\frac{X_{Ai} - X_{B(i-1)}}{(C+1)D/2}$$

calculating a vertical coordinate of the actual center point of the gesture in the $i^{th}$ frame of image according to a formula $$Y_{Bi} = Y_{B(i-1)} + (Q_2 + 1)\frac{(C+1)D}{2},$$

when an absolute value of a remainder of $$\frac{Y_{Ai} - Y_{B(i-1)}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image; $X_{B(i-1)}$ is a horizontal coordinate of the actual center point of the gesture in the $(i-1)^{th}$ frame of image, and $Y_{(B(i-1))}$ is a vertical coordinate of the actual center point of the gesture in the $(i-1)^{th}$ frame of image.

In an embodiment, determining whether the center point of the gesture in the $i^{th}$ frame of image is within the preset region includes:

determining that the center point of the gesture in the $i^{th}$ frame of image is within the preset region when a quotient of $$\frac{X_{Ai} - X_{B(i-1)}}{(C+1)D/2}$$

is 0, an absolute value of a remainder of $$\frac{X_{Ai} - X_{B(i-1)}}{(C+1)D/2}$$

is less than $$\frac{CD}{2},$$

a quotient of $$\frac{Y_{Ai} - Y_{B(i-1)}}{(C+1)D/2}$$

is 0 and an absolute value of a remainder of $$\frac{Y_{Ai} - Y_{B(i-1)}}{(C+1)D/2}$$

is less than $$\frac{CD}{2};$$

determining that the center point of the gesture in the $i^{th}$ frame of image is not within the preset region when the quotient of $$\frac{X_{Ai} - X_{B(i-1)}}{(C+1)D/2}$$

is not 0; or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2};$$

or when the quotient of $$\frac{Y_{Ai} - Y_{B(i-1)}}{(C+1)D/2}$$

is not 0; or when the quotient of $$\frac{Y_{Ai} - Y_{B(i-1)}}{(C+1)D/2}$$

is 0 and the absolute value of the remainder of $$\frac{Y_{Ai} - Y_{B(i-1)}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B(i-1)}$ is a horizontal coordinate of the actual center point of the gesture in the $(i-1)^{th}$ frame of image, $Y_{B(i-1)}$ is a vertical coordinate of the actual center point of the gesture in the $(i-1)^{th}$ frame of image, C is a number of grids included in a side length of the preset region, and D is a number of pixels included in a side length of a grid.

In an embodiment, the coordinates of the actual center point of the gesture in the $i^{th}$ frame of image is calculated according to the coordinates of the center point of the gesture in the $i^{th}$ frame of image and the preset region if the center point of the gesture in the $i^{th}$ frame of image is within the preset region, so that the calculated coordinates of the actual center point of the gesture in the $i^{th}$ frame of image are the coordinates of the actual coordinates of the actual center point of the gesture in the $(i-1)^{th}$ frame of image.

According to an embodiment of the present disclosure, there is also provided a gesture recognition device which includes: an acquisition module configured to acquire coordinates of a center point of a gesture in an $i^{th}$ frame of image; a determination module configured to determine whether the center point of the gesture in the $i^{th}$ frame of image is within a preset region, and determine, if the center point of the gesture in the $i^{th}$ frame of image is within the preset region, that coordinates of an actual center point of the gesture in the $i^{th}$ frame of image are coordinates of an actual center point of the gesture in the $(i-1)^{th}$ frame of image; where i is an integer greater than or equal to 2, and the preset region is a region taking the actual center point of the gesture in the $(i-1)^{th}$ frame of image as a center; and a recognition module configured to perform a dynamic-gesture recognition according to coordinates of an actual center point of the gesture in each frame of image.

In an embodiment, the determination module is further configured to:

calculate, if the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

In an embodiment, the gesture recognition device further includes:

a division module configured to divide the image into a mesh including a plurality of grids, wherein the preset region is a region taking a grid, in which the actual center point of the gesture in the $(i-1)^{th}$ frame of image is located, as a center.

In an embodiment, the determination module calculates the coordinates of the actual center point of the gesture in the $i^{th}$ frame of image by:

calculating a horizontal coordinate of the actual center point of the gesture in the $i^{th}$ frame of image according to a formula $$X_{Bi} = X_{B1} + P_1 \frac{(C+1)D}{2},$$

when an absolute value of a remainder of $$\frac{X_{Ai} - X_{B1}}{(C+1)D/2}$$

is less than $$\frac{CD}{2};$$

and calculating a vertical coordinate of the actual center point of the gesture in the $i^{th}$ frame of image according to a formula $$X_{Bi} = Y_{B1} + P_2 \frac{(C+1)D}{2},$$

when an absolute value of a remainder of $$\frac{Y_{Ai} - Y_{B1}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of a actual center point of the gesture in a $1^{st}$ frame of image, $Y_{B1}$ is a vertical coordinate of a actual center point of the gesture in a $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

In an embodiment, the determination module calculates the coordinates of the actual center point of the gesture in the $i^{th}$ frame of image by:

calculating a horizontal coordinate of the actual center point of the gesture in the $i^{th}$ frame of image according to a formula $$X_{Bi} = X_{B(i-1)} + Q_1 \frac{(C+1)D}{2},$$

when an absolute value of a remainder of $$\frac{X_{Ai} - X_{B(i-1)}}{(C+1)D/2}$$

is less than $$\frac{CD}{2};$$

and calculating a vertical coordinate of the actual center point of the gesture in the $i^{th}$ frame of image according to a formula $$Y_{Bi} = Y_{B(i-1)} + Q_2 \frac{(C+1)D}{2},$$

when an absolute value of a remainder of $$\frac{Y_{Ai} - Y_{B(i-1)}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $X_{B(i-1)}$ is a horizontal coordinate of the actual center point of the gesture in the $(i-1)^{th}$ frame of image, $Y_{B(i-1)}$ is a vertical coordinate of the actual center point of the gesture in the $(i-1)^{th}$ frame of image.

In an embodiment, the determination module calculates the coordinates of the actual center point of the gesture in the $i^{th}$ frame of image by:

calculating a horizontal coordinate of the actual center point of the gesture in the $i^{th}$ frame of image according to a formula $$X_{Bi} = X_{B1} + (P_1 + 1)\frac{(C+1)D}{2},$$

when an absolute value of a remainder of $$\frac{CD}{2};$$

is greater than or equal to $$\frac{X_{Ai} - X_{B1}}{(C+1)D/2}$$

and calculating a vertical coordinate of the actual center point of the gesture in the $i^{th}$ frame of image according to a formula $$Y_{Bi} = Y_{B1} + (P_2 + 1)\frac{(C+1)D}{2},$$

when an absolute value of a remainder of $$\frac{Y_{Ai} - Y_{B1}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of a actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

In an embodiment, the determination module calculates the coordinates of the actual center point of the gesture in the $i^{th}$ frame of image by:

calculating a horizontal coordinate of the actual center point of the gesture in the $i^{th}$ frame of image according to a formula $$X_{Bi} = X_{B(i-1)} + (Q_1 + 1)\frac{(C+1)D}{2},$$

when an absolute value of a remainder of $$\frac{CD}{2};$$

is greater than or equal to $$\frac{X_{Ai} - X_{B(i-1)}}{(C+1)D/2}$$

and calculating a vertical coordinate of the actual center point of the gesture in the $i^{th}$ frame of image according to a formula $$Y_{Bi} = Y_{B(i-1)} + (Q_2 + 1)\frac{(C+1)D}{2},$$

when an absolute value of a remainder of $$\frac{CD}{2};$$

is greater than or equal to $$\frac{Y_{Ai} - Y_{B(i-1)}}{(C+1)D/2}$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image; $X_{B(i-1)}$ is a horizontal coordinate of the actual center point of the gesture in the $(i-1)^{th}$ frame of image, and $Y_{B(i-1)}$ is a vertical coordinate of the actual center point of the gesture in the $(i-1)^{th}$ frame of image.

In an embodiment, the determination module determines whether the center point of the gesture in the $i^{th}$ frame of image is within the preset region as follows:

determining that the center point of the gesture in the $i^{th}$ frame of image is within the preset region, when a quotient of $$\frac{X_{Ai} - X_{B(i-1)}}{(C+1)D/2}$$

is 0, an absolute value of a remainder of $$\frac{X_{Ai} - X_{B(i-1)}}{(C+1)D/2}$$

is less than $$\frac{CD}{2},$$

a quotient of $$\frac{Y_{Ai} - Y_{B(i-1)}}{(C+1)D/2}$$

is 0 and an absolute value of a remainder of $$\frac{Y_{Ai} - Y_{B(i-1)}}{(C+1)D/2}$$

is less than $$\frac{CD}{2};$$

determining that the center point of the gesture in the $i^{th}$ frame of image is not within the preset region when the quotient of $$\frac{X_{Ai} - X_{B(i-1)}}{(C+1)D/2}$$

is not 0; or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2};$$

or when the quotient of $$\frac{Y_{Ai} - Y_{B(i-1)}}{(C+1)D/2}$$

is not 0; or when the quotient of $$\frac{Y_{Ai} - Y_{B(i-1)}}{(C+1)D/2}$$

is 0 and the absolute value of the remainder of $$\frac{Y_{Ai} - Y_{B(i-1)}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{(B(i-1))}$ is a horizontal coordinate of the actual center point of the gesture in the $(i-1)^{th}$ frame of image, $Y_{(B(i-1))}$ is a vertical coordinate of the actual center point of the gesture in the $(i-1)^{th}$ frame of image, C is a number of grids included in a side length of the preset region, and D is a number of pixels included in a side length of a grid.

In an embodiment, the determination module is further configured to:

calculate coordinates of the actual center point of the gesture in the $i^{th}$ frame of image according to the coordinates of the center point of the gesture in the $i^{th}$ frame of image and the preset region, if the center point of the gesture in the $i^{th}$ frame of image is located within the preset region, so that the calculated coordinates of the actual center point of the gesture in the $i^{th}$ frame of image are the coordinates of the actual coordinates of the actual center point of the gesture in the $(i-1)^{th}$ frame of image.

According to an embodiment of the present disclosure, there is also provided a storage medium having computer instructions stored therein, wherein the computer instructions implement the gesture recognition method described above when being executed by a processor.

According to an embodiment of the present disclosure, there is also provided an apparatus including one or more processors and a storage, the storage having computer instructions stored therein, and the one or more processors are configured to run the computer instructions to implement the gesture recognition method as described above.

BRIEF DESCRIPTION OF THE FIGURES

The drawings, which constitute a part of the specification, are provided for purposes of further understanding and explaining the technical solutions of the present disclosure together with the embodiments of the present disclosure, and should not be considered as a limitation to the technical solutions of the present disclosure.

DETAILED DESCRIPTION

The embodiments of the present disclosure will be described in detail below in conjunction with the drawings. It should be noted that the embodiments and the features in the embodiments of the application may be combined with each other arbitrarily in the case of no conflicts.

The steps as shown in the flow charts of the drawings may be carried out in a computer system such as a set of computer-executable instructions. Moreover, although a logic sequence is shown in a flow chart, in some cases, the steps as illustrated or described may be carried out in a sequence different from the sequence here.

The term "gesture" herein refers to a movement of a part of the human body such as a hand or a limb, or a movement of an artificial tool such as an artificial limb, or a movement of an object held by a person (e.g., the person holds and waves a flag by a hand), and is used to express or convey information. In the specification, the expression "gesture in the $i^{th}$ frame of image" and the like refers to a graph or a trace formed by a movement of a part of the human body in this frame of image.

Figure 1:
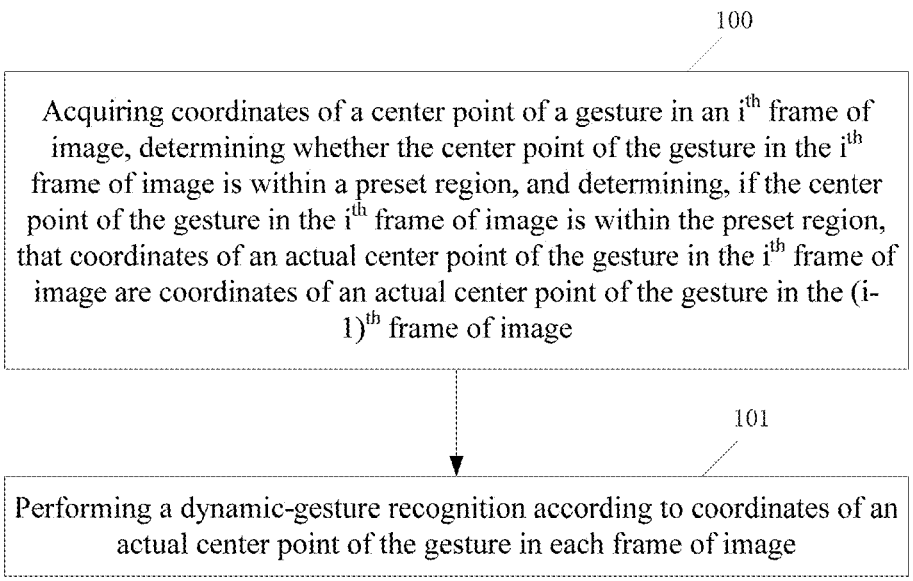
FIG. 1 is a flow chart of a gesture recognition method according to an embodiment of the present disclosure.

Referred to FIG. 1, an embodiment of the present disclosure provides a gesture recognition method including Step 100 and Step 101.

Step 100 includes: acquiring coordinates of a center point of a gesture in an $i^{th}$ frame of image, determining whether the center point of the gesture in the $i^{th}$ frame of image is within a preset region, and determining, if the center point of the gesture in the $i^{th}$ frame of image is within the preset region, that coordinates of an actual center point of the gesture in the $i^{th}$ frame of image are coordinates of an actual center point of the gesture in the $(i-1)^{th}$ frame of image.

In this step, i is an integer greater than or equal to 2, and the preset region is a region taking the actual center point of the gesture in the $(i-1)^{th}$ frame of image as a center.

As an example, the preset region may be in the shape of a square, or a circle, or has another shape, which is not particularly limited in the present application.

In a case where the preset region is in the shape of a square, whether the center point of the gesture in the $i^{th}$ frame of image is within the preset region may be determined as follows.

When an absolute value of a difference between a horizontal coordinate of the center point of the gesture in the $i^{th}$ frame of image and a horizontal coordinate of the actual center point of the gesture in the $(i-1)^{th}$ frame of image is less than a half of a side length of the preset region, and an absolute value of a difference between a vertical coordinate of the center point of the gesture in the $i^{th}$ frame of image and a vertical coordinate of the actual center point of the gesture in the $(i-1)^{th}$ frame of image is less than a half of the side length of the preset region, it is determined that the center point of the gesture in the $i^{th}$ frame of image is within the preset region.

When the absolute value of the difference between the horizontal coordinate of the center point of the gesture in the $i^{th}$ frame of image and the horizontal coordinate of the actual center point of the gesture in the $(i-1)^{th}$ frame of image is greater than or equal to a half of the side length of the preset region, or the absolute value of the difference between the vertical coordinate of the center point of the gesture in the $i^{th}$ frame of image and the vertical coordinate of the actual center point of the gesture in the $(i-1)^{th}$ frame of image is greater than or equal to a half of the side length of the preset region, it is determined that the center point of the gesture in the $i^{th}$ frame of image is not within the preset region.

In a case where the preset region is in the shape of a circle, whether the center point of the gesture in the $i^{th}$ frame of image is within the preset region may be determined as follows.

When a distance between the center point of the gesture in the $i^{th}$ frame of image and the actual center point of the gesture in the $(i-1)^{th}$ frame of image is less than a radius of the preset region, it is determined that the center point of the gesture in the $i^{th}$ frame of image is within the preset region.

When the distance between the center point of the gesture in the $i^{th}$ frame of image and the actual center point of the gesture in the $(i-1)^{th}$ frame of image is greater than or equal to the radius of the preset region, it is determined that the center point of the gesture in the $i^{th}$ frame of image is not within the preset region.

In the present embodiment, the gesture may be recognized from the $i^{th}$ frame of image, then a detection box in which the gesture is located is determined (the detection box is the minimum rectangular box including the gesture), and the coordinates of the center point of the gesture may be determined based on the detection box. For example, the coordinates of the center point of the detection box is the coordinates of the center point of the gesture.

To facilitate subsequent calculations, the center point of the gesture may be defined as the origin of the coordinate system. Obviously, the origin of the coordinate system may not be the center point of the gesture.

In this step, when the center point of the gesture in the $i^{th}$ frame of image is within the preset region, the coordinates of the actual center point of the gesture in the $(i-1)^{th}$ frame of image may be directly used as the coordinates of the actual center point of the gesture in the $i^{th}$ frame of image; obviously, the coordinates of the actual center point of the gesture in the $i^{th}$ frame of image may be calculated according to the calculation rules (which will be described later) based on the coordinates of the center point of the gesture in the $i^{th}$ frame of image and the preset region, so that the calculated coordinates of the actual center point of the gesture in the $i^{th}$ frame of image are equal to the coordinates of the actual center point of the gesture in the $(i-1)^{th}$ frame of image.

Step 101 includes: performing a dynamic-gesture recognition according to the coordinates of the actual center point of the gesture in each frame of image.

In the embodiment of the present disclosure, when the center point of the gesture in a frame of image is within the preset region, the coordinates of the actual center point of the gesture in the previous frame of image is used as the coordinates of the actual center point of the gesture in this frame of image. That is to say, a gesture whose center point is in the preset region is considered as a result of an unintentional shake, and is thus determined as an invalid gesture. In this way, an unintentional shake of the hand will not induce an instantaneous feedback for the hand in the image frame, thereby ensuring a continuous change in the recognized dynamic gesture.

In an embodiment, the method further includes: dividing the image into a mesh having a plurality of grids.

In the present embodiment, when dividing the image into a mesh having a plurality of grids, the center point of the gesture in the first frame of image may be taken as a center point of a grid in which the center point of the gesture in the first frame is located. In this case, the center point of the gesture in the first frame of image is an actual center point of the gesture in the first frame of image.

Obviously, when dividing the image into a mesh having a plurality of grids, the center point of the gesture in the first frame of image may not be taken as the center point of the grid in which the center point of the gesture in the first frame of image is located. In this case, the actual center point of the gesture in the first frame of image should be re-determined as the center point of the grid in which the center point of the gesture in the first frame of image is located.

Obviously, taking the center point of the gesture in the first frame of image as the center point of the grid in which the center point of the gesture in the first frame of image is a specific implementation.

Figure 2:
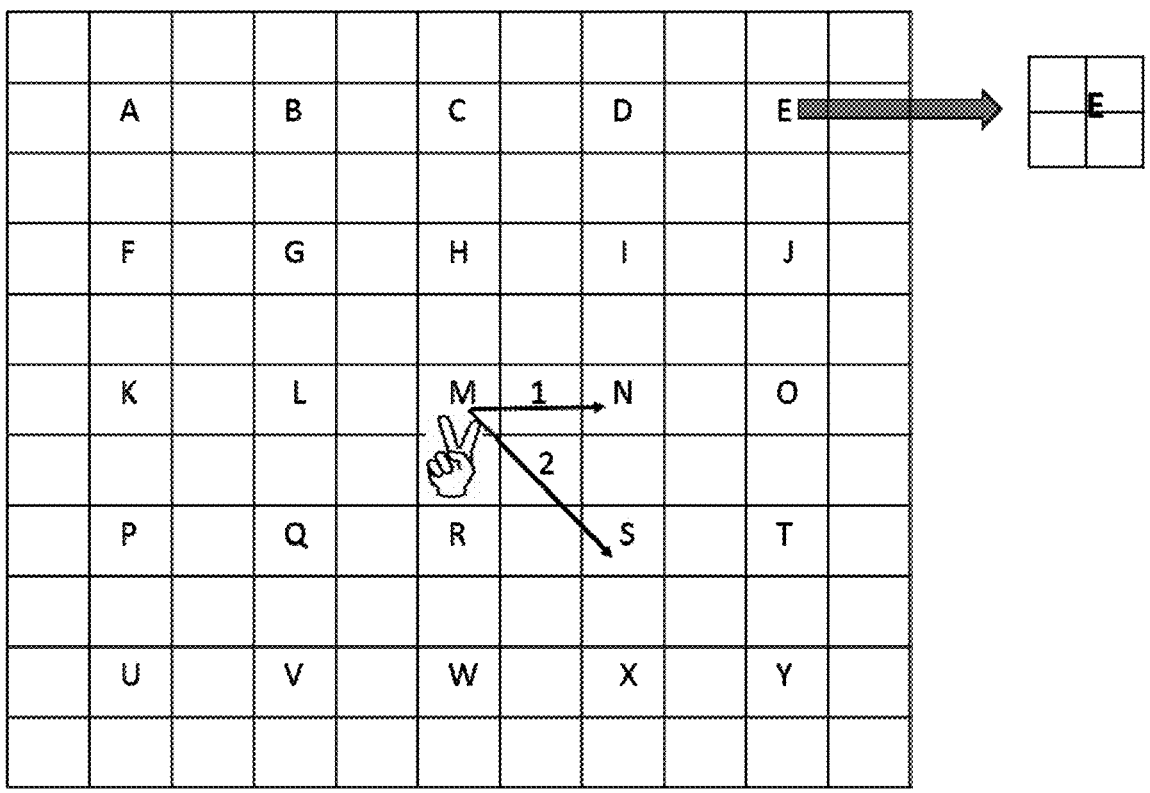
FIG. 2 is a schematic diagram of dividing an image into a mesh including a plurality of grids according to an embodiment of the present disclosure.

After the image is divided into a mesh having a plurality of grids, a grid in which the actual center point of the gesture is probably located is set as a core grid. As shown in FIG. 2, the grid M is a grid in which the center point of the gesture in the first frame of image is located, and the grids in which the letters A to Y are located respectively are the core grids. The layout of the core grids in FIG. 2 indicates that the eight grids adjacent to the grid in which the letter is located can hardly serve as the grid in which the actual center point of the gesture is located. It should be noted that, FIG. 2 shows an example only, and it does not indicate that only the mesh structure shown in FIG. 2 can be obtained by dividing the image.

When the image is divided as mentioned above, each grid in the mesh may be a square of D×D pixels, where D is an integer greater than or equal to 1; that is, the side length of each grid includes D pixels. As shown in FIG. 2, each grid in FIG. 2 is a square of 2×2 pixels; the arrow pointing outwards from the grid E indicates that the grid E is constructed by a square of 2×2 pixels, that is, the side length of each grid includes 2 pixels. It should be noted that, the case that the side length of each grid includes 2 pixels as shown in FIG. 2 is only an example, and it does not mean that the side length of each grid can only include 2 pixels when an image is divided.

In an embodiment, D is equal to 2E, where E is an integer greater than or equal to 1. That is to say, the side length of each grid includes an even number of pixels.

In an embodiment, D is 2.

In this case, in Step 100, if the preset region is a square, the preset region may be a C×C square taking the grid, in which the actual center point of the gesture in the $(i-1)^{th}$ frame of image is located, as its center, where C is an integer greater than or equal to 2, that is, the side length of the preset region includes C grids. As shown in FIG. 2, the preset region in FIG. 2 is a 3×3 square, that is, the side length of the preset region includes 3 grids. It should be noted that the case that the side length of the preset region includes 3 grids as shown in FIG. 2 is only an example, and it does not mean that the side length of the preset region can only include 3 grids when the preset region is set.

In an embodiment, C is equal to 2K+1, where K is an integer greater than or equal to 1. That is to say, the side length of the preset region includes an odd number of grids.

In an embodiment, C is 3.

It has been proved in practice that, in a case where C is 3 and D is 2, if the center point of the gesture in the $i^{th}$ frame of image is within a square region of 3×3 grids that takes the grid, in which the actual center point of the gesture in the $(i-1)^{th}$ frame of image is located, as the center, then the coordinates of the actual center point of the gesture in the $(i-1)^{th}$ frame of image are taken as the coordinates of the actual center point of the gesture in the $i^{th}$ frame of image. In this way, not only an instantaneous feedback of a hand in the image frame induced by an unintentional shake of the hand is avoided, but also the continuity of the recognized dynamic gesture is ensured.

In the present embodiment, if one pixel is set as a unit of the coordinates, whether the center point of the gesture in the $i^{th}$ frame of image is within the preset region may be determined by any one of the following methods.

$$|X_{Ai} - X_{B(i-1)}| < \frac{CD}{2}, \text{ and } |Y_{Ai} - Y_{B(i-1)}| < \frac{CD}{2},$$

In the first method, when it is determined that the center point of the gesture in the $i^{th}$ frame of image is within the preset region; when $$|X_{Ai} - X_{B(i-1)}| \geq \frac{CD}{2}, \text{ or } |Y_{Ai} - Y_{B(i-1)}| \geq \frac{CD}{2},$$

it is determined that the center point of the gesture in the $i^{th}$ frame of image is not within the preset region.

$$\frac{X_{Ai} - X_{B(i-1)}}{(C+1)D/2}$$

In the second method, when a quotient of is 0, an absolute value of a remainder of $$\frac{X_{Ai} - X_{B(i-1)}}{(C+1)D/2}$$

is less than $$\frac{CD}{2},$$

a quotient of $$\frac{Y_{Ai} - Y_{B(i-1)}}{(C+1)D/2}$$

is 0 and an absolute value of $$\frac{Y_{Ai} - Y_{B(i-1)}}{(C+1)D/2}$$

a remainder of is less than $$\frac{CD}{2},$$

it is determined that the center point of the gesture in the $i^{th}$ frame of image is within the preset region; when the quotient of $$\frac{X_{Ai} - X_{B(i-1)}}{(C+1)D/2}$$

is not 0, or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2},$$

or when the quotient of $$\frac{Y_{Ai} - Y_{B(i-1)}}{(C+1)D/2}$$

is not 0, or when the quotient of $$\frac{Y_{Ai} - Y_{B(i-1)}}{(C+1)D/2}$$

is 0 and the absolute value of the remainder of $$\frac{Y_{Ai} - Y_{B(i-1)}}{(C+1)D/2}$$

is greater than or equal to $$\frac{CD}{2},$$

it is determined that the center point of the gesture in the $i^{th}$ frame of image is not within the preset region.

The above expression $$\frac{(C+1)D}{2}$$

represents a difference between horizontal coordinates or vertical coordinates of two adjacent points each of which is probably used as the actual center point of the gesture. Since an actual center point of the gesture is the center point of a grid, the difference between horizontal coordinates or vertical coordinates of two adjacent points each of which is probably used as the actual center point of the gesture is equal to a half of the side length of the preset region $$\left(\text{i.e., } \frac{CD}{2}\right)$$

plus the length of half a grid $$\left(\text{i.e., } \frac{D}{2}\right),$$

and thus $$\frac{(C+1)D}{2}$$

is obtained.

Where, $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B(i-1)}$ is a horizontal coordinate of the actual center point of the gesture in the $(i-1)^{th}$ frame of image, $Y_{B(i-1)}$ is a vertical coordinate of the actual center point of the gesture in the $(i-1)^{th}$ frame of image, C is the number of the grids included in the side length of the preset region, and D is the number of the pixels included in the side length of the grid.

In the present embodiment, when the center point of the gesture in the $i^{th}$ frame of image is not within the preset region, the coordinates of the actual center point of the gesture in the $i^{th}$ frame of image is calculated according to the coordinates of the center point of the gesture in the $i^{th}$ frame of image and the preset region.

In an embodiment, the coordinates of the actual center point of the gesture in the $i^{th}$ frame of image is calculated according to the coordinates of the center point of the gesture in the $i^{th}$ frame of image, the number of the grids included in the side length of the preset region, and the number of the pixels included in the side length of the grid, that is, the coordinates of the actual center point of the gesture in the $i^{th}$ frame of image may be calculated by any of the following methods. It should be noted that, if the center point of the gesture in the $i^{th}$ frame of image is within the preset region, the coordinates of the actual center point of the gesture in the $i^{th}$ frame of image may be calculated by any of the following methods, and the coordinates of the actual center point of the gesture in the $i^{th}$ frame of image as calculated in this case are the same as the coordinates of the actual center point of the gesture in the $(i-1)^{th}$ frame of image.

In the first method, when an absolute value of a remainder of $$\frac{X_{Ai} - X_{B1}}{(C+1)D/2}$$

is less than $$\frac{CD}{2},$$

the horizontal coordinate of the actual center point of the gesture in the $i^{th}$ frame of image is calculated according to a formula $$X_{Bi} = X_{B1} + P_1 \frac{(C+1)D}{2};$$

when the absolute value of the remainder of $$\frac{X_{Ai} - X_{B1}}{(C+1)D/2}$$

is greater than or equal to $$\frac{CD}{2},$$

the horizontal coordinate of the actual center point of the gesture in the $i^{th}$ frame of image is calculated according to a formula $$X_{Bi} = X_{B1} + (P_1 + 1)\frac{(C+1)D}{2};$$

when an absolute value of a remainder of $$\frac{Y_{Ai} - Y_{B1}}{(C+1)D/2}$$

is less than $$\frac{CD}{2},$$

the vertical coordinate of the actual center point of the gesture in the $i^{th}$ frame of image according to a formula $$Y_{Bi} = Y_{B1} + P_2\frac{(C+1)D}{2};$$

when the absolute value of the remainder of $$\frac{Y_{Ai} - Y_{B1}}{(C+1)D/2}$$

is greater than or equal to $$\frac{CD}{2},$$

the vertical coordinate of the actual center point of the gesture in the $i^{th}$ frame of image is calculated according to a formula $$Y_{Bi} = Y_{B1} + (P_2 + 1)\frac{(C+1)D}{2};$$

where $X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{B1}$ is the horizontal coordinate of the actual center point of the gesture in the $1^{st}$ frame of image, and $Y_{B1}$ is the vertical coordinate of the actual center point of the gesture in the $1^{st}$ frame of image.

In the second method, when an absolute value of a remainder of $$\frac{X_{Ai} - X_{B(i-1)}}{(C+1)D/2}$$

is less than $$\frac{CD}{2},$$

the horizontal coordinate of the actual center point of the gesture in the $i^{th}$ frame of image is calculated according to a formula $$X_{Bi} = X_{B(i-1)} + Q_1\frac{(C+1)D}{2};$$

when the absolute value of the remainder of $$\frac{X_{Ai} - X_{B(i-1)}}{(C+1)D/2}$$

is greater than or equal to $$\frac{CD}{2},$$

the horizontal coordinate of the actual center point of the gesture in the $i^{th}$ frame of image according to a formula $$X_{Bi} = X_{B(i-1)} + (Q_1 + 1)\frac{(C+1)D}{2};$$

when an absolute value of a remainder of $$\frac{Y_{Ai} - Y_{B(i-1)}}{(C+1)D/2}$$

is less than $$\frac{CD}{2},$$

the vertical coordinate of the actual center point of the gesture in the $i^{th}$ frame of image is calculated according to a formula $$Y_{Bi} = Y_{B(i-1)} + Q_2 \frac{(C+1)D}{2};$$

when the absolute value of the remainder of $$\frac{Y_{Ai} - Y_{B(i-1)}}{(C+1)D/2}$$

is greater than or equal to $$\frac{CD}{2},$$

the vertical coordinate of the actual center point of the gesture in the $i^{th}$ frame of image is calculated according to a formula $$Y_{Bi} = Y_{B(i-1)} + (Q_2 + 1)\frac{(C+1)D}{2};$$

where $X_{Bi}$ is the horizontal coordinate of the actual center point of the gesture in the $i^{th}$ frame of image, $X_{B(i-1)}$ is the horizontal coordinate of the actual center point of the gesture in the $(i-1)^{th}$ frame of image, $Y_{Bi}$ is the vertical coordinate of the actual center point of the gesture in the $i^{th}$ frame of image, $Y_{B(i-1)}$ is the vertical coordinate of the actual center point of the gesture in the $(i-1)^{th}$ frame of image, $Q_1$ is a quotient of $$\frac{X_{Ai} - X_{B(i-1)}}{(C+1)D/2},$$

and $Q_2$ is a quotient of $$\frac{Y_{Ai} - Y_{B(i-1)}}{(C+1)D/2}.$$

In an embodiment, C is equal to 2E+1 and D is equal to 2E; where E is an integer greater than or equal to 1.

In an embodiment, C is 3 and D is 2. It has been proved that, in a case where C is 3 and D is 2, if the center point of the gesture in the $i^{th}$ frame of image is within a square region of 3×3 grids that takes the grid, in which the center point of the gesture in the $(i-1)^{th}$ frame of image is located, as the center, then the coordinates of the actual center point of the gesture in the previous frame of image are taken as the coordinates of the actual center point of the gesture in the present frame of image. In this way, not only an instantaneous feedback of a hand in the image frame induced by an unintentional shake of the hand is avoid, but also the continuity of the recognized dynamic gesture is ensured.

Figure 3:
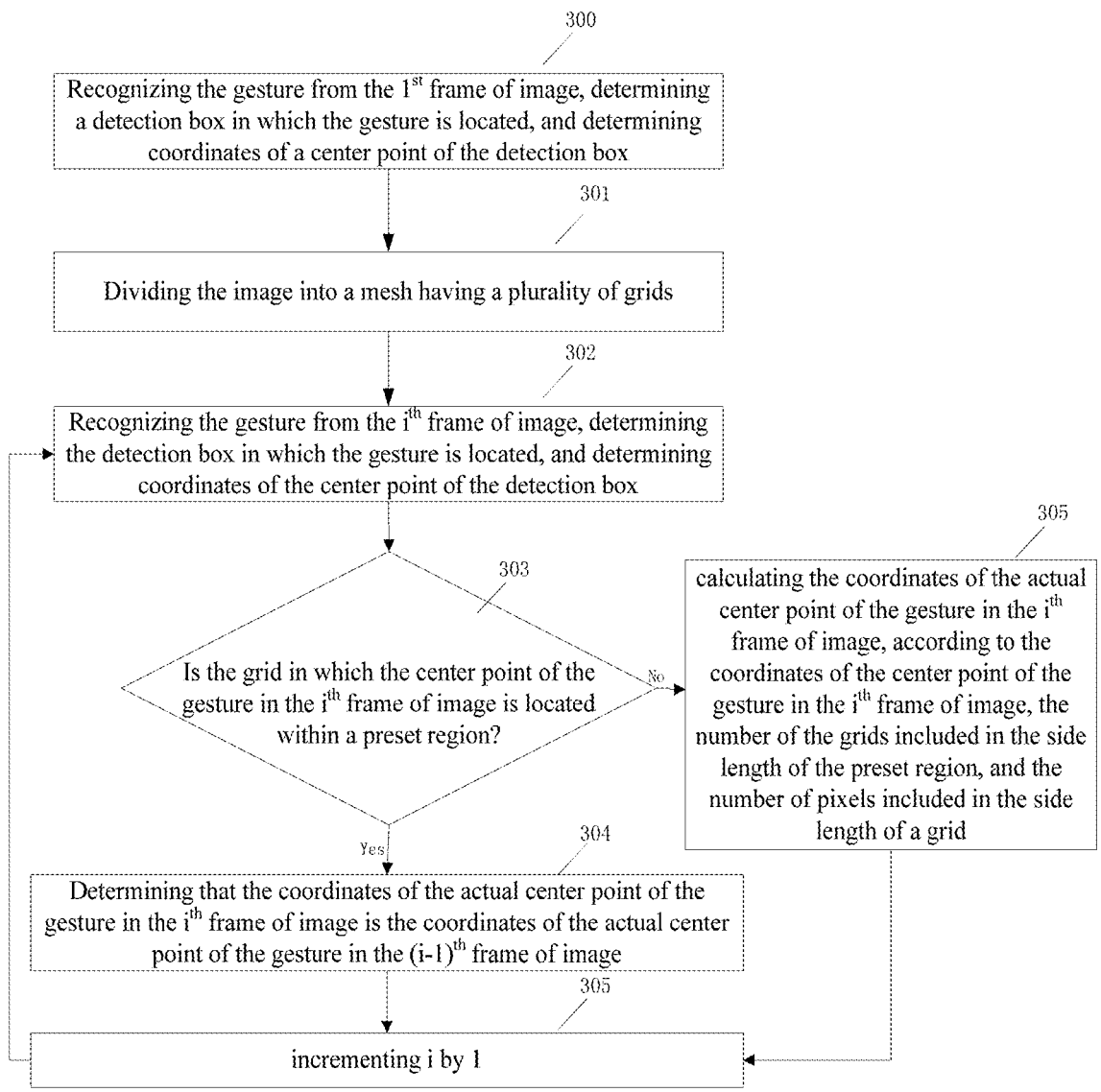
FIG. 3 is a flow chart of an implementation of a gesture recognition method according to an embodiment of the present disclosure.

FIG. 3 is an implementation of the present embodiment including steps S301 to S306.

Step 300 includes: recognizing the gesture from the $1^{st}$ frame of image, determining a detection box in which the gesture is located, and determining coordinates of a center point of the detection box.

Step 301 includes: meshing the image into a mesh having a plurality of grids.

In this step, after the image is divided, the center point of the detection box in which the gesture in the first frame of image is located becomes a center point (which is the origin) of a grid in which the center point of the gesture in the first frame of image is located; and each grid in the mesh is a square of 2×2 pixels. As shown in FIG. 2, the arrow pointing outwards from the grid E indicates that the grid E is constructed by a square of 2×2 pixels.

Step 302 includes: recognizing the gesture from the $i^{th}$ frame of image, determining a detection box in which the gesture is located, and determining the coordinates of the center point of the detection box.

Step 303 includes: determining whether the grid in which the center point of the gesture in the $i^{th}$ frame of image is located is within the preset region; and if yes, performing Step 304; if no, performing Step 305.

In this step, the preset region is a square of 3×3 grids taking the grid, in which the actual center point of the gesture in the $(i-1)^{th}$ frame of image is located, as the center.

For example, in a case where the coordinates of the actual center point of the gesture in the $(i-1)^{th}$ frame of image are (0, 0), as shown by the center point of the grid M in FIG. 2, if the coordinates of the center point of the gesture in the $i^{th}$ frame of image are (4, 0), then the $$\frac{4-0}{(3+1)\times 2/2}$$

quotient of is 1. Therefore, the grid in which the center point of the gesture in the $i^{th}$ frame of image is located is not within the preset region.

Step 304 includes: determining that the coordinates of the actual center point of the gesture in the $i^{th}$ frame of image is the coordinates of the actual center point of the gesture in the $(i-1)^{th}$ frame of image.

Step 305 includes: calculating the coordinates of the actual center point of the gesture in the $i^{th}$ frame of image, according to the coordinates of the center point of the gesture in the $i^{th}$ frame of image, the number of the grids included in the side length of the preset region, and the number of pixels included in the side length of the grid.

For example, in the case where the coordinates of the actual center point of the gesture in the $(i-1)^{th}$ frame of image are (0, 0), as shown by the center point of the grid M in FIG. 2, if the coordinates of the center point of the gesture in the $i^{th}$ frame of image are (4, 0), then the quotient of $$\frac{4-0}{(3+1)\times 2/2}$$

is 1, and the remainder is 0, which is smaller than $$\frac{3\times 2}{2}=3,$$

thus, the horizontal coordinate of the actual center point of the gesture in the $i^{th}$ frame of image is $$0+1\times\frac{(3+1)\times 2}{2}=4;$$

the quotient of $$\frac{0-0}{(3+1)\times 2/2}$$

is 0, and the remainder is 0, which is smaller than $$\frac{3\times 2}{2}=3,$$

thus the vertical coordinate of the actual center point of the gesture in the $i^{th}$ frame of image is $$0+0\times\frac{(3+1)\times 2}{2}=0.$$

That is, the coordinates of the actual center point of the gesture in the $i^{th}$ frame of image are (4, 0), as shown by the center point of the grid N in FIG. 2. This means that the actual center point of the gesture is updated from the grid M to the grid N, as shown by the arrow 1 in FIG. 2.

If the coordinates of the center point of the gesture in the $i^{th}$ frame of image are (5, 6), then the quotient of $$\frac{5-0}{(3+1)\times 2/2}$$

is 1, and the remainder is 1, which is smaller than $$\frac{3\times 2}{2}=3,$$

thus, the horizontal coordinate of the actual center point of the gesture in the $i^{th}$ frame of image is $$0+1\times\frac{(3+1)\times 2}{2}=4;$$

the quotient of $$\frac{6-0}{(3+1)\times 2/2}$$

is 0, and the remainder is 2, which is <smaller than $$\frac{3\times 2}{2}=3,$$

thus the vertical coordinate of the actual center point of the gesture in the $i^{th}$ frame of image is $$0+1\times\frac{(3+1)\times 2}{2}=4.$$

That is, the coordinates of the actual center point of the gesture in the $i^{th}$ frame of image are (4, 4), as shown by the center point of the grid S in FIG. 2. This means that the actual center point of the gesture is updated from the grid M to the grid S, as shown by the arrow 2 in FIG. 2.

Step 306 includes: incrementing i by 1, and then performing steps 302 to 305.

Figure 4:
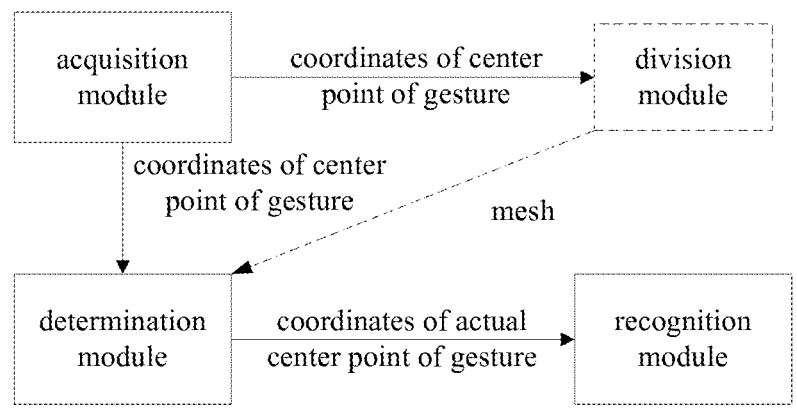
FIG. 4 is a block diagram of a gesture recognition device according to an embodiment of the present disclosure.

FIG. 4 is a block diagram of a gesture recognition device of an embodiment of the present disclosure. Referred to FIG. 4, an embodiment of the present disclosure provides a gesture recognition device including an acquisition module, a determination module and a recognition module.

The acquisition module is configured to acquire the coordinates of the center point of the gesture in the $i^{th}$ frame of image.

The determination module is configured to determine whether the center point of the gesture in the $i^{th}$ frame of image is located within the preset region.

The determination module is further configured to determine, if the center point of the gesture in the $i^{th}$ frame of image is located within the preset region, that the coordinates of the actual center point of the gesture in the $i^{th}$ frame of image is the coordinates of the actual center point of the gesture in the $(i-1)^{th}$ frame of image; where i is an integer greater than or equal to 2, and the preset region is a region which takes the actual center point of the gesture in the $(i-1)^{th}$ frame of image as its center.

The recognition module is configured to perform a dynamic-gesture recognition according to the coordinates of the actual center point of the gesture in each frame of image.

In an embodiment, the determination module is further configured to: calculate, if the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

In an embodiment, the gesture recognition device further includes a division module configured to divide the image into a mesh having a plurality of grids; the preset region is a region that takes a grid in which the actual center point of the gesture in the $(i-1)^{th}$ frame of image is located as its center.

In an embodiment, the determination module is particularly configured to calculate the coordinates of the actual center point of the gesture in the $i^{th}$ frame of image by: calculating the horizontal coordinate of the actual center point of the gesture in the $i^{th}$ frame of image according to a formula $$X_{Bi}=X_{B1}+P_1\frac{(C+1)D}{2},$$

when an absolute value of a remainder of is less than $$\frac{CD}{2};$$

calculating the vertical coordinate of the actual center point of the gesture in the $i^{th}$ frame of image according to a formula $$Y_{Bi} = Y_{B1} + P_2 \frac{(C+1)D}{2},$$

when an absolute value of a remainder of $$\frac{Y_{Ai} - Y_{B1}}{(C+1)D/2}$$

is less than $$\frac{CD}{2};$$

or, calculating the horizontal coordinate of the actual center point of the gesture in the $i^{th}$ frame of image according to a formula $$X_{Bi} = X_{B(i-1)} + Q_1 \frac{(C+1)D}{2},$$

when an absolute value of a remainder of $$\frac{X_{Ai} - X_{B(i-1)}}{(C+1)D/2}$$

is less than $$\frac{CD}{2};$$

calculating the vertical coordinate of the actual center point of the gesture in the $i^{th}$ frame of image according to a formula $$Y_{Bi} = Y_{B(i-1)} + Q_2 \frac{(C+1)D}{2},$$

when an absolute value of a remainder of $$\frac{Y_{Ai} - Y_{B(i-1)}}{(C+1)D/2}$$

is less than $$\frac{CD}{2};$$

where $X_{Ai}$ is the horizontal coordinate of the center point of the gesture in the $i^{th}$ frame of image, $Y_{Ai}$ is the vertical coordinate of the center point of the gesture in the $i^{th}$ frame of image, $X_{B1}$ is the horizontal coordinate of the actual center point of the gesture in the $1^{st}$ frame of image, $Y_{B1}$ is the vertical coordinate of the actual center point of the gesture in the $1^{st}$ frame of image, C is the number of the grids included in the side length of the preset region, D is the number of the pixels included in the side length of the grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2};$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $X_{B(i-1)}$ is the horizontal coordinate of the actual center point of the gesture in the $(i-1)^{th}$ frame of image, and $Y_{B(i-1)}$ is the vertical coordinate of the actual center point of the gesture in the $(i-1)^{th}$ frame of image.

In an embodiment, the determination module particularly calculates the coordinates of the actual center point of the gesture in the $i^{th}$ frame of image by: calculating the horizontal coordinate of the actual center point of the gesture in the $i^{th}$ frame of image according to a formula $$X_{Bi} = X_{B1} + (P_1 + 1) \frac{(C+1)D}{2},$$

when an absolute value of a remainder of $$\frac{X_{Ai} - X_{B1}}{(C+1)D/2}$$

is greater than or equal to $$\frac{CD}{2};$$

calculating the vertical coordinate of the actual center point of the gesture in the $i^{th}$ frame of image according to a formula $$Y_{Bi} = Y_{B1} + (P_2 + 1)\frac{(C+1)D}{2},$$

when an absolute value of a remainder of $$\frac{Y_{Ai} - Y_{B1}}{(C+1)D/2}$$

is greater than or equal to $$\frac{CD}{2};$$

or calculating the horizontal coordinate of the actual center point of the gesture in the $i^{th}$ frame of image according to a formula $$X_{Bi} = X_{B(i-1)} + (Q_1 + 1)\frac{(C+1)D}{2},$$

when an absolute value of a remainder of $$\frac{X_{Ai} - X_{B(i-1)}}{(C+1)D/2}$$

is greater than or equal to $$\frac{CD}{2};$$

calculating the vertical coordinate of the actual center point of the gesture in the $i^{th}$ frame of image according to a formula $$Y_{Bi} = Y_{B(i-1)} + (Q_2 + 1)\frac{(C+1)D}{2},$$

when an absolute value of a remainder of $$\frac{Y_{Ai} - Y_{B(i-1)}}{(C+1)D/2}$$

is greater than or equal to $$\frac{CD}{2};$$

where $X_{Ai}$ is the horizontal coordinate of the center point of the gesture in the $i^{th}$ frame of image, $Y_{Ai}$ is the vertical coordinate of the center point of the gesture in the $i^{th}$ frame of image, $X_{B1}$ is the horizontal coordinate of the actual center point of the gesture in the $1^{st}$ frame of image, $Y_{B1}$ is the vertical coordinate of the actual center point of the gesture in the $1^{st}$ frame of image, C is the number of the grids included in the side length of the preset region, D is the number of the pixels included in the side length of the grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image; $X_{(B(i-1))}$ is the horizontal coordinate of the actual center point of the gesture in the $(i-1)^{th}$ frame of image, and $Y_{B(i-1)}$ is the vertical coordinate of the actual center point of the gesture in the $(i-1)^{th}$ frame of image.

In an embodiment, C is equal to 2E+1 and D is equal to 2E; where E is an integer greater than or equal to 1.

In an embodiment, C is 3 and D is 2.

In an embodiment, the determination module determines whether the center point of the gesture in the $i^{th}$ frame of image is within the preset region in the following way: determining that the center point of the gesture in the $i^{th}$ frame of image is within the preset region, when the quotient of $$\frac{X_{Ai} - X_{B(i-1)}}{(C+1)D/2}$$

is 0, the absolute value of the remainder of $$\frac{X_{Ai} - X_{B(i-1)}}{(C+1)D/2}$$

is less than $$\frac{CD}{2},$$

the quotient of $$\frac{Y_{Ai} - Y_{B(i-1)}}{(C+1)D/2}$$

is 0, and the absolute value of the remainder of $$\frac{Y_{Ai} - Y_{B(i-1)}}{(C+1)D/2}$$

is less than $$\frac{CD}{2};$$

on the other hand, determining that the center point of the gesture in the $i^{th}$ frame of image is not within the preset region when the quotient of $$\frac{X_{Ai} - X_{B(i-1)}}{(C+1)D/2}$$

is not 0; or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2};$$

or when the quotient of $$\frac{Y_{Ai} - Y_{B(i-1)}}{(C+1)D/2}$$

is not 0; or when the quotient of $$\frac{Y_{Ai} - Y_{B(i-1)}}{(C+1)D/2}$$

is 0 and the absolute value of the remainder of $$\frac{Y_{Ai} - Y_{B(i-1)}}{(C+1)D/2}$$

is greater than or equal to $$\frac{CD}{2};$$

where $X_{Ai}$ is the horizontal coordinate of the center point of the gesture in the $i^{th}$ frame of image, $Y_{Ai}$ is the vertical coordinate of the center point of the gesture in the $i^{th}$ frame of image, $X_{B(i-1)}$ is the horizontal coordinate of the actual center point of the gesture in the $(i-1)^{th}$ frame of image, $Y_{B(i-1)}$ is the vertical coordinate of the actual center point of the gesture in the $(i-1)^{th}$ frame of image, C is the number of the grids included by the side length of the preset region, D is the number of the pixels included by the side length of the grid.

In an embodiment, the determination module is particularly configured to calculate, when the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

It should be noted that, the gesture recognition device may be implemented as a storage and a processor coupled with each other. The storage may store computer-executable instructions that can be executed by the processor to perform the steps of the gesture recognition method provided by an embodiment of the present disclosure. For example, by executing the computer-executable instructions, the processor may achieve the function(s) of one or more of the acquisition module, the determination module, the recognition module and the division module as described above. The functions of the modules achieved by executing the computer-executable instructions by the processor may be combined arbitrarily, as long as they do not conflict with each other.

Suitable examples of the storage includes, but not limited to: a magnetic disc or a magnetic tape; an optical storage medium such as a compact disc (CD) or a digital versatile disc (DVD); a flash storage; and other non-temporary medium. In an embodiment, the storage is a non-temporary storage.

Obviously, the gesture recognition device according to the embodiments of the present disclosure is not limited thereto, and may be implemented as a combination of other software and hardware.

An embodiment of the present disclosure further provides a storage medium in which computer instructions are stored, and the computer instructions, when executed by a processor, perform the gesture recognition method provided by any of the above embodiments.

Figure 5:
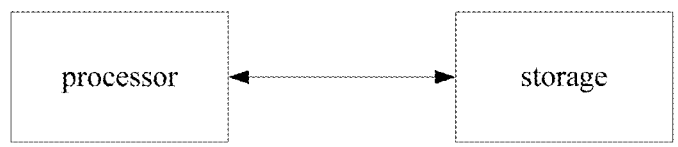
FIG. 5 is a block diagram of a gesture recognition apparatus according to an embodiment of the present disclosure.

FIG. 5 is a block diagram of a gesture recognition apparatus according to an embodiment of the present disclosure. Referring to FIG. 5, the apparatus includes one or more processors and a storage. The storage has computer instructions stored therein, and the processor is configured to run the computer instructions to perform the gesture recognition method provided by any of the above embodiments.

Although the embodiments of the present disclosure are described as above, the described contents are implementations simply for the sake of understanding the present disclosure, instead of limiting the present disclosure. Any person of ordinary skilled in the art to which the present disclosure belongs may make various modifications and variations to the forms and details of the implementations without departing from the spirit and the scope of the present disclosure. However, the patent protection scope of the present disclosure should be defined by the appended claims.

What is claimed is:

1. A gesture recognition method, comprising:
   acquiring coordinates of a center point of a gesture in an $i^{th}$ frame of image;
   determining whether the center point of the gesture in the $i^{th}$ frame of image is within a preset region;
   determining, if the center point of the gesture in the $i^{th}$ frame of image is within the preset region, that coordinates of an actual center point of the gesture in the $i^{th}$ frame of image are coordinates of an actual center point of the gesture in the $(i-1)^{th}$ frame of image; wherein i is an integer greater than or equal to 2, and the preset region is a region taking the actual center point of the gesture in the $(i-1)^{th}$ frame of image as a center; and
   performing a dynamic-gesture recognition according to coordinates of an actual center point of the gesture in each frame of image.

2. The gesture recognition method of claim 1, further comprising:
   calculating, if the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

3. The gesture recognition method of claim 2, further comprising:
   dividing the image into a mesh having a plurality of grids, wherein the preset region is a region taking a grid, in which the actual center point of the gesture in the $(i-1)^{th}$ frame of image is located, as a center.

4. The gesture recognition method of claim 3, wherein calculating the coordinates of the actual center point of the gesture in the $i^{th}$ frame of image comprises:
   calculating a horizontal coordinate of the actual center point of the gesture in the $i^{th}$ frame of image according to a formula $$X_{Bi} = X_{B1} + P_1 \frac{(C+1)D}{2},$$

when an absolute value of a remainder of $$\frac{X_{Ai} - X_{B1}}{(C+1)D/2}$$

is less than $$\frac{CD}{2};$$

and
calculating a vertical coordinate of the actual center point of the gesture in the $i^{th}$ frame of image according to a formula $$Y_{Bi} = Y_{B1} + P_2 \frac{(C+1)/D}{2},$$

when an absolute value of a remainder of $$\frac{Y_{Ai} - Y_{B1}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of an actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{Y_{Ai} - Y_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

5. The gesture recognition method of claim 3, wherein calculating the coordinates of the actual center point of the gesture in the $i^{th}$ frame of image comprises:
   calculating a horizontal coordinate of the actual center point of the gesture in the $i^{th}$ frame of image according to a formula $$Y_{Bi} = Y_{B(i-1)} + Q_1 \frac{(C+1)/D}{2},$$

when an absolute value of a remainder of $$\frac{Y_{Ai} - Y_{B(i-1)}}{(C+1)D/2}$$

is less than $$\frac{CD}{2};$$

and
   calculating a vertical coordinate of the actual center point of the gesture in the $i^{th}$ frame of image according to a formula $$Y_{Bi} = Y_{B(i-1)} + Q_2 \frac{(C+1)/D}{2},$$

when an absolute value of a remainder of $$\frac{Y_{Ai} - Y_{B(i-1)}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $X_{B(i-1)}$ is a horizontal coordinate of the actual center point of the gesture in the $(i-1)^{th}$ frame of image, and $Y_{B(i-1)}$ is a vertical coordinate of the actual center point of the gesture in the $(i-1)^{th}$ frame of image.

6. The gesture recognition method of claim 3, wherein calculating the coordinates of the actual center point of the gesture in the $i^{th}$ frame of image comprises:
calculating a horizontal coordinate of the actual center point of the gesture in the $i^{th}$ frame of image according to a formula $$X_{Bi} = X_{B1} + (P_1 + 1)\frac{(C+1)/D}{2},$$

when an absolute value of a remainder of $$\frac{X_{Ai} - X_{B1}}{(C+1)D/2}$$

is greater than or equal to $$\frac{CD}{2};$$

and calculating a vertical coordinate of the actual center point of the gesture in the $i^{th}$ frame of image according to a formula $$Y_{Bi} = Y_{B1} + (P_2 + 1)\frac{(C+1)D}{2},$$

when an absolute value of a remainder of $$\frac{Y_{Ai} - Y_{B1}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of an actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

7. The gesture recognition method of claim 3, wherein calculating the coordinates of the actual center point of the gesture in the $i^{th}$ frame of image comprises:
calculating a horizontal coordinate of the actual center point of the gesture in the $i^{th}$ frame of image according to a formula $$X_{Bi} = X_{B(i-1)} + (Q_1 + 1)\frac{(C+1)D}{2},$$

when an absolute value of a remainder of $$\frac{CD}{2};$$

is greater than or equal to $$\frac{X_{Ai} - X_{B(i-1)}}{(C+1)D/2}$$

and calculating a vertical coordinate of the actual center point of the gesture in the $i^{th}$ frame of image according to a formula $$Y_{Bi} = Y_{B(i-1)} + (Q_2 + 1)\frac{(C+1)D}{2},$$

when an absolute value of a remainder of $$\frac{CD}{2};$$

is greater than or equal to $$\frac{Y_{Ai} - Y_{B(i-1)}}{(C+1)D/2}$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image; $X_{B(i-1)}$ is a horizontal coordinate of the actual center point of the gesture in the $(i-1)^{th}$ frame of image, and $Y_{B(i-1)}$ is a vertical coordinate of the actual center point of the gesture in the $(i-1)^{th}$ frame of image.

8. The gesture recognition method of claim 3, wherein determining whether the center point of the gesture in the $i^{th}$ frame of image is within the preset region comprises:

determining that the center point of the gesture in the $i^{th}$ frame of image is within the preset region when a quotient of $$\frac{X_{Ai} - X_{B(i-1)}}{(C+1)D/2}$$

is 0 and an absolute value of a remainder of $$\frac{X_{Ai} - X_{B(i-1)}}{(C+1)D/2}$$

is less than $$\frac{CD}{2}$$

while a quotient of $$\frac{Y_{Ai} - Y_{B(i-1)}}{(C+1)D/2}$$

is 0 and an absolute value of a remainder of $$\frac{Y_{Ai} - Y_{B(i-1)}}{(C+1)D/2}$$

is less than $$\frac{CD}{2};$$

determining that the center point of the gesture in the $i^{th}$ frame of image is not within the preset region when the quotient of $$\frac{X_{Ai} - X_{B(i-1)}}{(C+1)D/2}$$

is not 0; or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2};$$

or when the quotient of $$\frac{Y_{Ai} - Y_{B(i-1)}}{(C+1)D/2}$$

is not 0; or when the quotient of $$\frac{Y_{Ai} - Y_{B(i-1)}}{(C+1)D/2}$$

is 0 and the absolute value of the remainder of $$\frac{CD}{2};$$

is greater than or equal to $$\frac{Y_{Ai} - Y_{B(i-1)}}{(C+1)D/2}$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B(i-1)}$ is a horizontal coordinate of the actual center point of the gesture in the $(i-1)^{th}$ frame of image, $Y_{B(i-1)}$ is a vertical coordinate of the actual center point of the gesture in the $(i-1)^{th}$ frame of image, C is a number of grids included in a side length of the preset region, and D is a number of pixels included in a side length of a grid.

9. The gesture recognition method of claim 1, wherein the coordinates of the actual center point of the gesture in the $i^{th}$ frame of image is calculated according to the coordinates of the center point of the gesture in the $i^{th}$ frame of image and the preset region if the center point of the gesture in the $i^{th}$ frame of image is within the preset region, so that the calculated coordinates of the actual center point of the gesture in the $i^{th}$ frame of image are the coordinates of the actual coordinates of the actual center point of the gesture in the $(i-1)^{th}$ frame of image.

10. A gesture recognition device, comprising:
an acquisition module configured to acquire coordinates of a center point of a gesture in an $i^{th}$ frame of image;
a determination module configured to determine whether the center point of the gesture in the $i^{th}$ frame of image is within a preset region, and determine, if the center point of the gesture in the $i^{th}$ frame of image is within the preset region, that coordinates of an actual center point of the gesture in the $i^{th}$ frame of image are coordinates of an actual center point of the gesture in the $(i-1)^{th}$ frame of image; where i is an integer greater than or equal to 2, and the preset region is a region taking the actual center point of the gesture in the $(i-1)^{th}$ frame of image as a center; and
a recognition module configured to perform a dynamic-gesture recognition according to coordinates of an actual center point of the gesture in each frame of image.

11. The gesture recognition device of claim 10, wherein the determination module is further configured to:
calculate, if the center point of the gesture in the $i^{th}$ frame of image is not within the preset region, the coordinates of the actual center point of the gesture in the $i^{th}$ frame of image according to the coordinates of the center point of the gesture in the $i^{th}$ frame of image and the preset region.

12. The gesture recognition device of claim 11, further comprising:
a division module configured to divide the image into a mesh having a plurality of grids, wherein the preset region is a region taking a grid, in which the actual center point of the gesture in the $(i-1)^{th}$ frame of image is located, as a center.

13. The gesture recognition device of claim 12, wherein the determination module calculates the coordinates of the actual center point of the gesture in the $i^{th}$ frame of image by:
calculating a horizontal coordinate of the actual center point of the gesture in the $i^{th}$ frame of image according to a formula $$X_{Bi} = X_{B1} + P_1 \frac{(C+1)D}{2},$$

when an absolute value of a remainder of $$\frac{X_{Ai} - X_{B1}}{(C+1)D/2}$$

is less than $$\frac{CD}{2};$$

and
calculating a vertical coordinate of the actual center point of the gesture in the $i^{th}$ frame of image according to a formula $$Y_{Bi} = Y_{B1} + P_2 \frac{(C+1)D}{2},$$

when an absolute value of a remainder of $$\frac{Y_{Ai} - Y_{B1}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of an actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

14. The gesture recognition device of claim 12, wherein the determination module calculates the coordinates of the actual center point of the gesture in the $i^{th}$ frame of image by:
    calculating a horizontal coordinate of the actual center point of the gesture in the $i^{th}$ frame of image according to a formula $$X_{Bi} = X_{B(i-1)} + Q_1 \frac{(C+1)D}{2},$$

when an absolute value of a remainder of $$\frac{X_{Ai} - X_{B(i-1)}}{(C+1)D/2}$$

is less than $$\frac{CD}{2};$$

and
    calculating a vertical coordinate of the actual center point of the gesture in the $i^{th}$ frame of image according to a formula $$Y_{Bi} = Y_{B(i-1)} + Q_2 \frac{(C+1)D}{2},$$

when an absolute value of a remainder of $$\frac{Y_{Ai} - Y_{B(i-1)}}{(C+1)D/2}$$

is less than $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image, $X_{B(i-1)}$ is a horizontal coordinate of the actual center point of the gesture in the $(i-1)^{th}$ frame of image, and $Y_{B(i-1)}$ is a vertical coordinate of the actual center point of the gesture in the $(i-1)^{th}$ frame of image.

15. The gesture recognition device of claim 12, wherein the determination module calculates the coordinates of the actual center point of the gesture in the $i^{th}$ frame of image by:
    calculating a horizontal coordinate of the actual center point of the gesture in the $i^{th}$ frame of image according to a formula $$X_{Bi} = X_{B1} + (P_1 + 1)\frac{(C+1)D}{2},$$

when an absolute value of a remainder of $$\frac{X_{Ai} - X_{B1}}{(C+1)D/2}$$

is greater than or equal to $$\frac{CD}{2};$$

and
    calculating a vertical coordinate of the actual center point of the gesture in the $i^{th}$ frame of image according to a formula $$Y_{Bi} = Y_{B1} + (P_2 + 1)\frac{(C+1)D}{2},$$

when an absolute value of a remainder of $$\frac{Y_{Ai} - Y_{B1}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B1}$ is a horizontal coordinate of an actual center point of the gesture in a $1^{st}$ frame of image, $Y_{B1}$ is a vertical coordinate of the actual center point of the gesture in the $1^{st}$ frame of image, C is a number of grids included in a side length of the preset region, D is a number of pixels included in a side length of a grid, $P_1$ is a quotient of $$\frac{X_{Ai} - X_{B1}}{(C+1)D/2},$$

$P_2$ is a quotient of $$\frac{Y_{Ai} - Y_{B1}}{(C+1)D/2},$$

$X_{Bi}$ is the horizontal coordinate of the actual center point of the gesture in the $i^{th}$ frame of image, and $Y_{Bi}$ is the vertical coordinate of the actual center point of the gesture in the $i^{th}$ frame of image.

16. The gesture recognition device of claim 12, wherein the determination module calculates the coordinates of the actual center point of the gesture in the $i^{th}$ frame of image by:

calculating a horizontal coordinate of the actual center point of the gesture in the $i^{th}$ frame of image according to a formula $$X_{Bi} = X_{B(i-1)} + (Q_1 + 1)\frac{(C+1)D}{2},$$

when an absolute value of a remainder of $$\frac{X_{Ai} - X_{B(i-1)}}{(C+1)D/2}$$

is greater than or equal to $$\frac{CD}{2};$$

and calculating a vertical coordinate of the actual center point of the gesture in the $i^{th}$ frame of image according to a formula $$Y_{Bi} = Y_{B(i-1)} + (Q_2 + 1)\frac{(C+1)D}{2},$$

when an absolute value of a remainder of $$\frac{Y_{Ai} - Y_{B(i-1)}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, C is a number of grids included in a side length of the preset region, D is a number of pixels included in a side length of a grid, $Q_1$ is a quotient of $$\frac{X_{Ai} - X_{B(i-1)}}{(C+1)D/2},$$

$Q_2$ is a quotient of $$\frac{Y_{Ai} - Y_{B(i-1)}}{(C+1)D/2},$$

$X_{Bi}$ is the horizontal coordinate of the actual center point of the gesture in the $i^{th}$ frame of image, $Y_{Bi}$ is the vertical coordinate of the actual center point of the gesture in the $i^{th}$ frame of image; $X_{(B(i-1))}$ is a horizontal coordinate of the actual center point of the gesture in the $(i-1)^{th}$ frame of image, and $Y_{(B(i-1))}$ is a vertical coordinate of the actual center point of the gesture in the $(i-1)^{th}$ frame of image.

17. The gesture recognition device of claim 12, wherein the determination module determines whether the center point of the gesture in the $i^{th}$ frame of image is within the preset region by:

determining that the center point of the gesture in the $i^{th}$ frame of image is within the preset region, when a quotient of $$\frac{X_{Ai} - X_{B(i-1)}}{(C+1)D/2}$$

is 0 and an absolute value of a remainder of $$\frac{X_{Ai} - X_{B(i-1)}}{(C+1)D/2}$$

is less than $$\frac{CD}{2}$$

while a quotient of $$\frac{Y_{Ai} - Y_{B(i-1)}}{(C+1)D/2}$$

is 0 and an absolute value of a remainder of is less than $$\frac{CD}{2};$$

determining that the center point of the gesture in the $i^{th}$ frame of image is not within the preset region when the quotient of $$\frac{X_{Ai} - X_{B(i-1)}}{(C+1)D/2}$$

is not 0; or when the quotient of $$\frac{X_{Ai} - X_{B(i-1)}}{(C+1)D/2}$$

is 0 and the absolute value of the remainder of $$\frac{X_{Ai} - X_{B(i-1)}}{(C+1)D/2}$$

is greater than or equal to $$\frac{CD}{2};$$

or when the quotient of $$\frac{Y_{Ai} - Y_{B(i-1)}}{(C+1)D/2}$$

is not 0; or when the quotient of $$\frac{Y_{Ai} - Y_{B(i-1)}}{(C+1)D/2}$$

is 0 and the absolute value of the remainder of $$\frac{Y_{Ai} - Y_{B(i-1)}}{(C+1)D/2}$$

is greater than or equal to $$\frac{CD}{2};$$

where $X_{Ai}$ is a horizontal coordinate of the center point of the gesture in the $i^{th}$ frame of image, $Y_{Ai}$ is a vertical coordinate of the center point of the gesture in the $i^{th}$ frame of image, $X_{B(i-1)}$ is a horizontal coordinate of the actual center point of the gesture in the $(i-1)^{th}$ frame of image, $Y_{B(i-1)}$ is a vertical coordinate of the actual center point of the gesture in the $(i-1)^{th}$ frame of image, C is a number of grids included in a side length of the preset region, and D is a number of pixels included by a side length in a grid.

18. The gesture recognition device of claim 10, wherein the determination module is configured to:
calculate coordinates of the actual center point of the gesture in the $i^{th}$ frame of image according to the coordinates of the center point of the gesture in the $i^{th}$ frame of image and the preset region, when the center point of the gesture in the $i^{th}$ frame of image is located within the preset region, so that the calculated coordinates of the actual center point of the gesture in the $i^{th}$ frame of image are the coordinates of the actual coordinates of the actual center point of the gesture in the $(i-1)^{th}$ frame of image.

19. A non-transitory storage medium, having computer instructions stored therein, wherein the computer instructions perform the gesture recognition method of claim 1 when being executed by a processor.

20. An apparatus, comprising one or more processors and a storage, the storage having computer instructions stored therein, and the processors are configured to run the computer instructions to perform the gesture recognition method of claim 1.

* * * * *